US008254582B2

(12) United States Patent
Brown et al.

(10) Patent No.: US 8,254,582 B2
(45) Date of Patent: Aug. 28, 2012

(54) SYSTEM AND METHOD FOR CONTROLLING MESSAGE ATTACHMENT HANDLING FUNCTIONS ON A MOBILE DEVICE

(75) Inventors: Michael S. Brown, Kitchener (CA); Michael K. Brown, Kitchener (CA); Michael G. Kirkup, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 774 days.

(21) Appl. No.: 11/859,980

(22) Filed: Sep. 24, 2007

(65) Prior Publication Data

US 2009/0080661 A1    Mar. 26, 2009

(51) Int. Cl.
H04L 29/06    (2006.01)

(52) U.S. Cl. ....................................................... 380/279

(58) Field of Classification Search .................. 380/279
See application file for complete search history.

(56) References Cited

U.S. PATENT DOCUMENTS

| | | | |
|---|---|---|---|
| 4,028,500 | A | 6/1977 | McClure et al. |
| 5,410,602 | A | 4/1995 | Finkelstein et al. |
| 5,457,748 | A | 10/1995 | Bergum et al. |
| 5,647,002 | A | 7/1997 | Brunson |
| 5,666,530 | A | 9/1997 | Clark et al. |
| 5,754,778 | A | 5/1998 | Shoujima |
| 5,771,355 | A * | 6/1998 | Kuzma .......................... 709/232 |
| 5,812,671 | A | 9/1998 | Ross, Jr. |
| 6,061,448 | A | 5/2000 | Smith et al. |
| 6,073,237 | A | 6/2000 | Ellison |
| 6,081,601 | A | 6/2000 | Raivisto |
| 6,084,969 | A | 7/2000 | Wright et al. |
| 6,085,323 | A | 7/2000 | Shimizu et al. |
| 6,119,228 | A | 9/2000 | Angelo et al. |
| 6,229,894 | B1 | 5/2001 | Van Oorschot et al. |
| 6,266,420 | B1 | 7/2001 | Langford et al. |
| 6,275,850 | B1 * | 8/2001 | Beyda et al. .................. 709/206 |
| 6,289,105 | B1 | 9/2001 | Murota |
| 6,356,937 | B1 | 3/2002 | Montville et al. |
| 6,397,261 | B1 * | 5/2002 | Eldridge et al. .............. 713/171 |

(Continued)

FOREIGN PATENT DOCUMENTS

CA    2639161    3/2009

(Continued)

OTHER PUBLICATIONS

Gmail, "How do I set up filters?", Apr. 5, 2007, http://mail.google.com/support/bin/answer.py?answer=6579.*

(Continued)

Primary Examiner — Kim Vu
Assistant Examiner — John B King
(74) Attorney, Agent, or Firm — Bereskin & Parr LLP/S.E.N.C.R.L., s.r.l.

(57) ABSTRACT

A system and method for controlling message attachment handling functions on a mobile device is described herein. An attachment handling control can be set to identify one of a number of selected attachment handling control modes. Depending on the attachment handling control mode identified, a request for the attachment structure that includes a decrypted session key for an encrypted message received at the mobile device may or may not be automatically sent to a remote server. This may provide the user with increased control over the content of an encrypted message that the remote server may access when determining the attachment structure for a message.

19 Claims, 8 Drawing Sheets

U.S. PATENT DOCUMENTS

| | | |
|---|---|---|
| 6,616,038 B1 | 9/2003 | Olschafskie et al. |
| 6,661,927 B1 | 12/2003 | Suarez et al. |
| 6,684,088 B1 | 1/2004 | Halahmi |
| 6,779,115 B1 | 8/2004 | Naim |
| 6,795,924 B1 | 9/2004 | Kiessling et al. |
| 6,829,357 B1 | 12/2004 | Alrabady et al. |
| 6,865,191 B1 | 3/2005 | Bengtsson et al. |
| 6,868,274 B1 | 3/2005 | Ayabe et al. |
| 6,904,521 B1 | 6/2005 | Jivsov |
| 6,918,038 B1 | 7/2005 | Smith et al. |
| 6,925,568 B1 | 8/2005 | Heinonen |
| 6,983,367 B2 | 1/2006 | Go et al. |
| 6,993,137 B2 | 1/2006 | Fransdonk |
| 7,020,708 B2 | 3/2006 | Nelson et al. |
| 7,113,927 B1 | 9/2006 | Tanaka et al. |
| 7,113,976 B2 | 9/2006 | Watanabe |
| 7,127,604 B2 | 10/2006 | Lide et al. |
| 7,143,181 B2 | 11/2006 | Koka et al. |
| 7,171,552 B1 | 1/2007 | Bell |
| 7,196,807 B2 | 3/2007 | Goldstone |
| 7,228,418 B1 | 6/2007 | Girault |
| 7,254,712 B2 | 8/2007 | Godfrey et al. |
| 7,313,825 B2 | 12/2007 | Redlich et al. |
| 7,392,547 B2 | 6/2008 | Cahill et al. |
| 7,422,131 B2 | 9/2008 | Cohen et al. |
| 7,529,374 B2 | 5/2009 | Huttunen |
| 7,590,700 B2 | 9/2009 | Hirose et al. |
| 7,653,815 B2 * | 1/2010 | Godfrey et al. ............... 713/176 |
| 7,814,161 B2 * | 10/2010 | Brown et al. ................. 709/206 |
| 7,827,406 B2 * | 11/2010 | Brown et al. ................. 713/170 |
| 7,840,207 B2 | 11/2010 | Adams et al. |
| 7,949,355 B2 | 5/2011 | Brown |
| 8,050,653 B2 | 11/2011 | Brown |
| 8,195,128 B2 | 6/2012 | Brown et al. |
| 2001/0046307 A1 | 11/2001 | Wong |
| 2002/0007453 A1 | 1/2002 | Nemovicher |
| 2002/0032861 A1 | 3/2002 | Azuma |
| 2002/0035687 A1 | 3/2002 | Skantze |
| 2002/0059383 A1 | 5/2002 | Katsuda |
| 2002/0065042 A1 | 5/2002 | Picoult et al. |
| 2002/0099727 A1 | 7/2002 | Kadyk et al. |
| 2002/0199119 A1 * | 12/2002 | Dunnion et al. ............... 713/201 |
| 2003/0031320 A1 | 2/2003 | Fan et al. |
| 2003/0090502 A1 | 5/2003 | Yuasa et al. |
| 2003/0115448 A1 | 6/2003 | Bouchard |
| 2003/0142364 A1 | 7/2003 | Goldstone |
| 2003/0172122 A1 | 9/2003 | Little et al. |
| 2003/0198350 A1 | 10/2003 | Foster et al. |
| 2003/0236864 A1 | 12/2003 | Lai |
| 2004/0083364 A1 | 4/2004 | Andreaux et al. |
| 2004/0088348 A1 | 5/2004 | Yeager et al. |
| 2004/0103160 A1 | 5/2004 | Sheldon et al. |
| 2004/0117456 A1 | 6/2004 | Brooks |
| 2004/0186894 A1 * | 9/2004 | Jhingan et al. ................. 709/207 |
| 2004/0249892 A1 | 12/2004 | Barriga et al. |
| 2005/0015721 A1 | 1/2005 | Tsai |
| 2005/0054334 A1 | 3/2005 | Brown et al. |
| 2005/0114671 A1 | 5/2005 | Little et al. |
| 2005/0163320 A1 | 7/2005 | Brown et al. |
| 2005/0188219 A1 | 8/2005 | Annic et al. |
| 2005/0210289 A1 | 9/2005 | Brown et al. |
| 2005/0246763 A1 | 11/2005 | Corcoran et al. |
| 2006/0036865 A1 | 2/2006 | Brown et al. |
| 2006/0272006 A1 | 11/2006 | Wei et al. |
| 2007/0118874 A1 | 5/2007 | Adams et al. |
| 2007/0123217 A1 | 5/2007 | Adams et al. |
| 2007/0165844 A1 | 7/2007 | Little |
| 2008/0098237 A1 | 4/2008 | Dung et al. |
| 2009/0080661 A1 | 3/2009 | Brown et al. |

FOREIGN PATENT DOCUMENTS

| | | |
|---|---|---|
| CN | 1674590 A | 9/2005 |
| CN | 101453708 | 11/2011 |
| EP | 0500245 | 8/1992 |
| EP | 0841770 | 5/1998 |
| EP | 1096725 | 5/2001 |
| EP | 1096727 | 5/2001 |
| EP | 1 580 953 | 9/2005 |
| EP | 1580953 | 9/2005 |
| EP | 1 806 683 | 7/2007 |
| EP | 1806683 | 7/2007 |
| EP | 2034687 | 3/2009 |
| JP | 7-509333 | 10/1995 |
| JP | 8-251221 | 9/1996 |
| JP | 10-022992 | 1/1998 |
| KR | 1020030059303 | 7/2003 |
| WO | 96/36934 | 11/1996 |
| WO | 97/41661 | 11/1997 |
| WO | 98/34374 | 8/1998 |
| WO | 99/05814 | 2/1999 |
| WO | 99/06900 | 2/1999 |
| WO | 99/27678 | 6/1999 |
| WO | 00/69114 | 11/2000 |
| WO | 00/72506 | 11/2000 |
| WO | 01/24434 | 4/2001 |
| WO | 01/78491 | 10/2001 |
| WO | 02/01373 | 1/2002 |
| WO | 02/101580 | 12/2002 |
| WO | 03/005636 | 1/2003 |
| WO | 03/058483 | 7/2003 |
| WO | 2004/010661 | 1/2004 |

OTHER PUBLICATIONS

Crocker, S. et al., "MIME Object Security Services", IETF Standard, Internet Engineering Task Force, IETF, Oct. 1995.

Stallings, William, "S/MIME: E-mail Gets Secure", BYTE, McGraw-Hill Inc., St Peterborough, U.S., vol. 23, No. 7, Jul. 1998.

European Search and Examination Report. Application No. 07117061.7. Dated: Feb. 12, 2008.

United States Office Action. U.S. Appl. No. 10/805,932 Dated: May 14, 2008.

Request for Continued Examination and Amendment. U.S. Appl. No. 10/805,932 Dated: Mar. 25, 2008.

Advisory Action. U.S. Appl. No. 10/805,932 Dated: Dec. 20, 2007.

Amendment. U.S. Appl. No. 10/805,932 Dated: Nov. 23, 2007.

Co-pending U.S. Appl. No. 11/291,178, "Display of Secure Messages on a Mobile Communication Device", filed Nov. 30, 2005.

Co-pending U.S. Appl. No. 11/291,163, "Display of Secure Messages on a Mobile Communication Device", filed Nov. 30, 2005.

United States Office Action. U.S. Appl. No. 10/805,932 Dated: Sep. 25, 2007.

United States Office Action. U.S. Appl. No. 10/805,932 Dated: Jul. 13, 2007.

Responsive Amendment. U.S. Appl. No. 10/805,932, filed Apr. 26, 2007.

United States Office Action. U.S. Appl. No. 10/805,932 Dated: Jan. 26, 2007.

Co-pending U.S. Appl. No. 11/849,433, "System and Method for Processing Attachments to Messages Sent to a Mobile Device", filed Sep. 4, 2007.

Co-pending U.S. Appl. No. 10/805,932, "System and Method for Viewing Message Attachments", filed Mar. 22, 2004.

Responsive Amendment U.S. Appl. No. 10/805,932. Amendment Filed: Sep. 15, 2008.

United States Office Action Response, U.S. Appl. No. 10/805,932, dated Jan. 19, 2010.

United States Office Action, U.S. Appl. No. 10/805,932, dated Nov. 18, 2009.

United States Office Action Response, U.S. Appl. No. 10/805,932, dated Sep. 10, 2009.

United States Office Action, U.S. Appl. No. 10/805,932, dated Jun. 10, 2009.

United States RCE, U.S. Appl. No. 10/805,932, dated Mar. 23, 2009.

United States Advisory Action, U.S. Appl. No. 10/805,932, dated Mar. 10, 2009.

United States Office Action Response, U.S. Appl. No. 10/805,932, dated Feb. 23, 2009.

United States Office Action, U.S. Appl. No. 10/805,932, dated Dec. 23, 2008.

United States Advisory Action, U.S. Appl. No. 11/291,163 dated Feb. 1, 2010.

United States Office Action Response, U.S. Appl. No. 11/291,163 dated Jan. 19, 2010.
Interview Summary, U.S. Appl. No. 11/849,433 dated Jan. 5, 2011.
Supplemental Response including Applicant's Interview Summary, U.S. Appl. No. 10/805,932, dated Feb. 19, 2010.
Hoffman: "Enhanced Services for S/MIME," Database IETF RFC Online IETF; RFC 2634, 0611999, pp. 1-58 (Chapter 3, pp. 24-32), XP002220386.
Stallings, W., "SIMIME: E-mail Gets Secure", Byte, McGraw-Hili Inc., St. Peterborough, US, vol. 23, No. 7, Jul. 1998, pp. 41-42, XP000774260.
European Summons to Attend Oral Proceedings, European Patent Application No. 07117061.7, dated Jul. 9, 2010.
European Search Report, European Patent Application No. 07117061.7, dated Mar. 11, 2009.
Chinese Office Action, Chinese Patent Application No. 200810184253.3, dated Dec. 14, 2010.
United States Office Action, U.S. Appl. No. 11/291,163, dated Dec. 8, 2010.
United States Office Action Response, U.S. Appl. No. 11/291,163, dated Sep. 16, 2010.
Applicant's Interview Summary, U.S. Appl. No. 10/805,932, dated Feb. 19, 2010.
United States Office Action Response with RCE, U.S. Appl. No. 10/805,932, dated Feb. 3, 2011.
United States Advisory Action, U.S. Appl. No. 10/805,932, dated Feb. 5, 2010.
United States Office Action, U.S. Appl. No. 11/291,163, dated Apr. 16, 2010.
United States Office Action, U.S. Appl. No. 11/849,433, dated Jul. 21, 2010.
United States Office Action Response, U.S. Appl. No. 11/849,433, dated Oct. 19, 2010.
Hoffman, "Enhanced Services for SIMIME", Database IETF RFC Online IETF, RFC 2312, 0311998, pp. 1-20 (Chapter 3, pp. 24-32), XP002220386.
United States Office Action, U.S. Appl. No. 11/291,163, dated Apr. 3, 2009.
United States Office Action Response, U.S. Appl. No. 11/291,163, dated Jul. 2, 2009.
United States Office Action, U.S. Appl. No. 11/291,163, dated Nov. 16, 2009.
United States Office Action Response, U.S. Appl. No. 11/291,163, dated Feb. 17, 2010.
Katsuro Inaya, et al., "Use Windows CE Now", ASCII, Oct. 1, 1999, vol. 23, No. 10, pp. 266-285 (Chinese doc).
Hiroyuki Sawano, Create a Secure Electronic Mail Environment with SIMME!, @IT Security & Trust, May 30, 2001, URL, http://www.atmarkit.co.jp/fsecurity/special/O3smimeOI.html (Chinese doc).
Blom et al., "Conversational IP Mulitmedia Security", 4th International Workshop on mobile and Wireless Communications Network, Sep. 9-11, 2002, pp. 147-151.
Fumy et al., "Principals of Key Management," IEEE Journal on Selected Areas in Communications, VDI, 11, No. 5, Jun. 1999, pp. 785-793.
Eskicioglu et al., "A Key Transport Protocol Based on Secret Sharing Applications to Information Security", IEEE Transactions on Consumer Electronics, vol. 46, No. 4, Nov. 2002, pp. 816-824.
Kotzanikoloau et al., "Hybrid Key Establishment for Multiphase Self-organized Sensor Networks", 6 IEEE International Symposium on a World of Wireless Mobile and Multimedia Networks, Jun. 13-16, 2005, pp. 581-587.
Research in Motion Limited, Blackberry Security White Paper Release 4.0 2005 internet address: http://blackberry.comlknoewledgecenterpubliclivelink.exe?func=ll&objId=S2SO44&objAction=browse&sort=name.
Policht, Martin, Sql Server 2005 Security—Part 3 Encryption, Database Journal Internet Address: http://www.databasejournal.com/features/mssql/article.php/34S3931.
Encrypt Pre-shared Keys in Cisco 10S Router Configuration Example, Document 1 D 46420 Cisco Systems, Internet Address: http://www.cisco.com/en/US/tech/tk3721t echnologies~configuration~example09186a008f021336.shtml.

Kiely, Don, "Sql Server 2005 Secures Your Data Like Never Before", Sep. 29, 2005, Internet Address: http://www.devx.comlcodemaglArticle/29351?trk=DXESS DB.
Dusse et al., "SIMIME Version 2 Certificate Handling", Database IETF RFC Online IETF; RFC 2312, 0311988, pp. 1-20 (Chapter 2.1, Chapter 4.1) XP002220386.
Schumacher, "AutoPGP FAQ, Version 1," Internet Newsgroup, 'Online! (Apr. 19, 1994), XP002230742.
Levien, "Protecting Internet E-mail From Prying Eyes", Data Communications, McGraw Hill, New York, US, vol. 25, No. 6 (May 1, 1996), pp. 117-118, 120, 122, XP000587586.
Swerson, Limitations on Design Principals for Public Key Protocols, Security and Privacy, 1996, Proceedings, 1996 IEEE Symposium on Oakland, CA, US, May 6-8, 1996, Los Alamitos, CA, US, IEEE Computer Society, US, May 6, 1996, pp. 62-72, XP010164926.
Gong et al., "Multicast Security and Its Extension to a Mobile Environment", SRI International, Computer Science Laboratory, J.C. Baltzer AG, Science Publishers, Wireless Networks 1 (1995) pp. 281-295.
Lai, M.K.E., et al. "A Mobile Subscriber Proxy Preserving Writer-to-Reader Message Security", Military Communications Conference, 1996, Milcom '96, Conference Proceedings, IEEE McLean, VA, USA, Oct. 21-24, 1996, New York, NY, US, IEEE, US, Oct. 21, 1996, pp. 461-467, XP010203896.
Cole, R. et al. "An Architecture for a Mobile OSI Mail Access System", IEEE Journal on Selected Areas in Communications, IEEE Inc., New York, NY, US, vol. 7, No. 2, Feb. 1989, pp. 249-256, XP000904914.
Harris, A. "Content Privacy and Content Security Working Together", Internet Article, Content Technologies White Paper, 'Online!, Sep. 1999, pp. 8-9, XP002223158.
Torvinen, V. "Wireless PKI: Fundamentals", Internet Article Radicchio White Paper, 'Online! 2000, pp. 12-13, XP002223159.
Mambo, M. et al., "Proxy Signatures: Delegation of the Power to Sign Messages", IEICE Transactions on Fundamentals of Electronics, Communications and Computer sciences, IEICE Tokyo, JP, vol. E79, No. 9, Sep. 1, 1996, pp. 1338-1353, XP000679624.
Brown, M. et al., "PGP in Constrained Wireless Devices", Proceedings of the 19th Usenix Security Symposium, Denver, CO, Aug. 14-17, 2000, XP002210575.
Brown, I. et al., "A Proxy Approach to E-mail Security", Software Practice & Experience, John Wiley and Sons Ltd., Chichester GB, vol. 29, No. 12, Oct. 1999, pp. 1049-1060, XP000852351.
Sybramanyam, V. et al., "Security in Mobile Systems", Reliable Distributed Systems, 1998 Proceedings, 17th IEEE Symposium on W. Lafayette, IN, US, Oct. 20-23, 1998, Los Alamitos, CA, US, IEEE Computer Society, US, Oct. 20, 1998, pp. 407-412, XP010319125.
Gmail: How Do I Set Up Filters, http://web.archive.org/web/20070711000428/http://mail.google.com/support/bin/answer.py?answer=6579.
Crocker, S. "MIME Object Security Services", Network Working Group Request for Comments, Oct. 1995.
United States Notice of Allowance, U.S. Appl. No. 11/849,433, dated Jan. 18, 2011.
United States Office Action, U.S. Appl. No. 10/805,932, dated Sep. 9, 2010.
United States Office Action Response, U.S. Appl. No. 10/805,932, dated Aug. 16, 2010.
United States Office Action, U.S. Appl. No. 10/805,932, dated Apr. 14, 2010.
United States Office Action Response with RCE, U.S. Appl. No. 10/805,932, dated Feb. 17, 2010.
Interview Summary, U.S. Appl. No. 10/805,932, dated Feb. 18, 2010.
English Translation of Chinese Office Action, Chinese Patent Application No. 200810184253.3, dated Dec. 14, 2010.
United States Office Action Response and RCE, U.S. Appl. No. 11/291,163, dated Mar. 8, 2011.
United States Notice of Allowance and Examiner Interview Summary, U.S. Appl. No. 10/805,932, dated Jun. 24, 2011.
Co-pending U.S. Appl. No. 13/089,456 entitled, "System and Method for Processing Attachments to Messages Sent to a Mobile Device", filed Apr. 19, 2011.

Chinese Office Action dated Mar. 22, 2012, Chinese Patent Application No. 200810184253.3.
European Decision to Refuse a European Application dated Jan. 12, 2011, European Patent Application No. 07117061.7.
European Minutes in Accordance with Rule 124(4) EPC dated Jan. 12, 2011, European Patent Application No. 07117061.7.
Amendment dated Jul. 6, 2009, European Patent Application No. 07117061.7.
Amendment dated Oct. 20, 2010, European Patent Application No. 07117061.7.
Request for Continued Examination, U.S. Appl. No. 13/089,456 dated Mar. 15, 2012.
Office Action, U.S. Appl. No. 12/946,632 dated Feb. 27, 2012.
Office Action, U.S. Appl. No. 11/291,163 dated Mar. 14, 2012.
English Translation of Chinese Office Action, Chinese Patent Application No. 200810184253.3, dated Aug. 18, 2011.
Chinese Office Action, Chinese Patent Application No. 200810184253.3, dated Nov. 30, 2011.
Canadian Office Action, Canadian Patent Application No. 2,639,659, dated Nov. 29, 2011.
Co-pending U.S. Appl. No. 13/285,548 entitled, "System and Method for Viewing Message Attachments", filed Oct. 31, 2011.
Interview Summary, U.S. Appl. No. 13/089,456 dated Oct. 24, 2011.
United States Notice of Allowance, U.S. Appl. No. 13/089,456 dated Nov. 16, 2011.
United States Request for Continued Examination, U.S. Appl. No. 13/089,456 dated Dec. 8, 2011.
United States Notice of Allowance, U.S. Appl. No. 13/089,456 dated Jan. 3, 2012.
Notice of Allowance dated Apr. 13, 2012, U.S. Appl. No. 13/089,456.
Response dated Mar. 19, 2012, U.S. Appl. No. 12/946,632.
Office Action dated Apr. 5, 2012, U.S. Appl. No. 12/946,632.
Co-pending U.S. Appl. No. 13/459,388 entitled, "System and Method for Processing Attachments to Messages Sent to a Mobile Device" filed Apr. 30, 2012.

* cited by examiner

SYSTEM AND METHOD FOR CONTROLLING MESSAGE ATTACHMENT HANDLING FUNCTIONS ON A MOBILE DEVICE

TECHNICAL FIELD

Embodiments described herein relate generally to the processing of messages, such as e-mail messages, and more specifically to a system and method directed to the handling of message attachments for viewing on a mobile device.

BACKGROUND

Various mobile devices are adapted to permit users to view data associated with message attachments, in some form, on their mobile device. Some of these mobile devices are not equipped with native attachment viewers. In those cases, a message attachment is typically processed initially by a remote server. The remote server retrieves and potentially reformats attachment data, which is then transmitted to the mobile device. The attachment data received at the mobile device can then be processed by applications residing on the mobile device, and rendered as needed.

For example, messages addressed to a user of a mobile device may arrive at a message server and may then be routed to a message management server. The message management server may be configured to convert data associated with a message into a wireless device-friendly format before the message data is transmitted to the mobile device. However, in order to conserve bandwidth, in certain implementations the message management server will not send message attachments to the mobile device.

Instead, the message management server may analyze the message and provide data to the mobile device that indicates the existence of one or more attachments to the message. Subsequently, the user of the mobile device may request a specific attachment. The request is sent to the message management server or an attachment server that is configured to process the message, retrieve the requested attachment, and send data associated with the attachment (e.g. text, images) to the mobile device, typically in a device-friendly format.

BRIEF DESCRIPTION OF THE DRAWINGS

For a better understanding of embodiments described herein, and to show more clearly how they may be carried into effect, reference will now be made, by way of example, to the accompanying drawings in which.

DETAILED DESCRIPTION

Some embodiments described herein make use of a mobile station. A mobile station generally comprises a two-way communication device with advanced data communication capabilities having the capability to communicate with other devices, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device may communicate with other devices through a network of transceiver stations.

Figure 1:
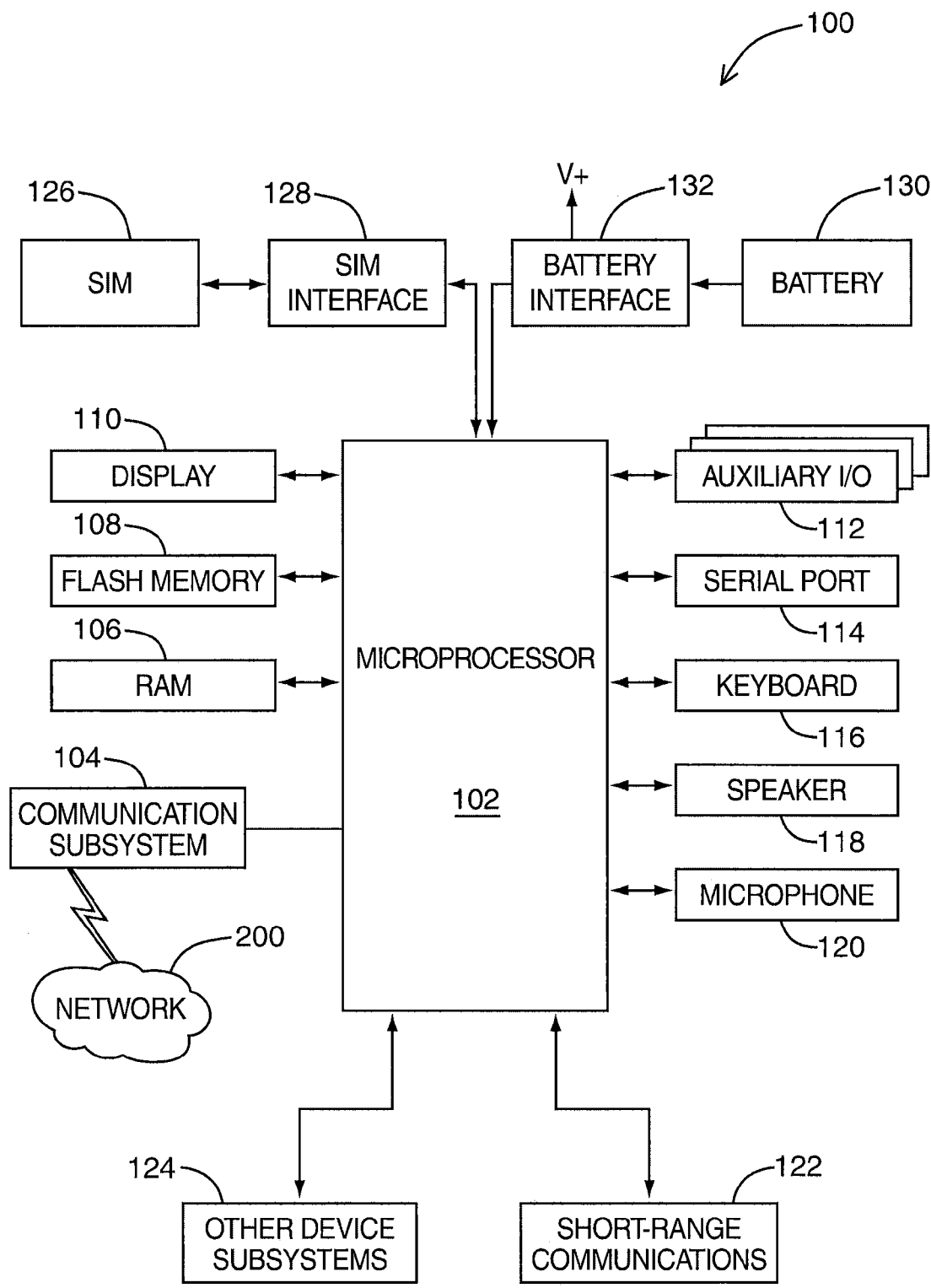
FIG. 1 is a block diagram of a mobile device in one example implementation.
Figure 2:
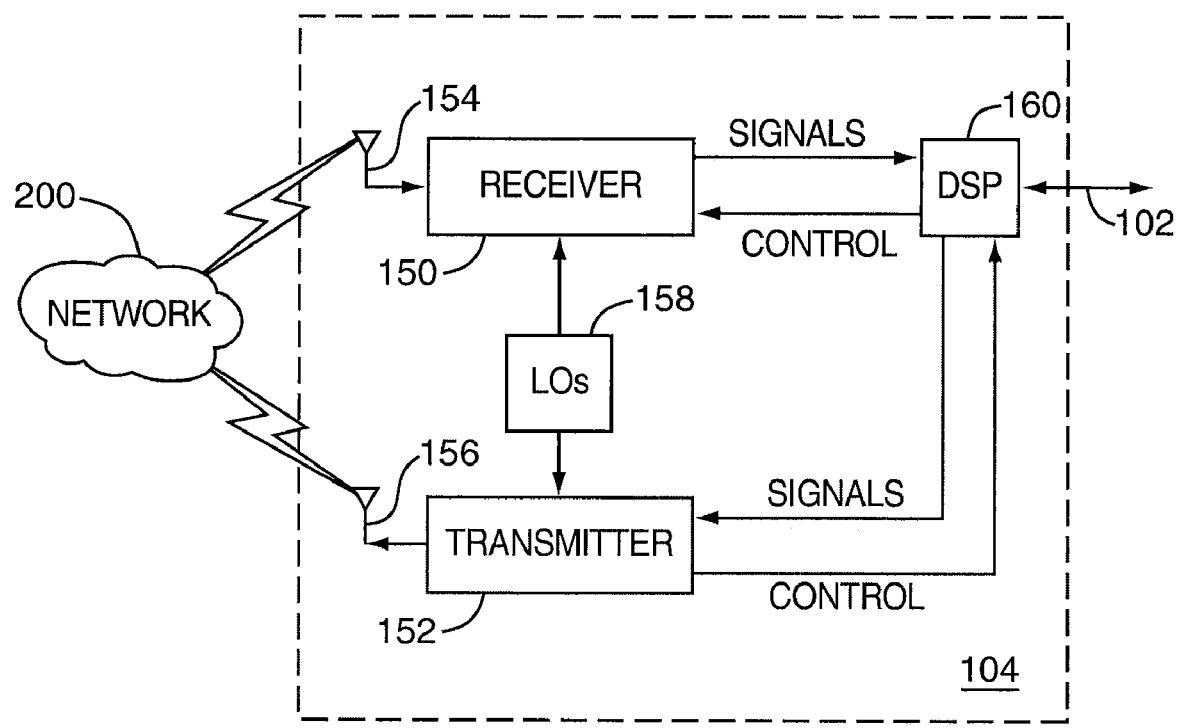
FIG. 2 is a block diagram of a communication subsystem component of the mobile device of FIG. 1.
Figure 3:
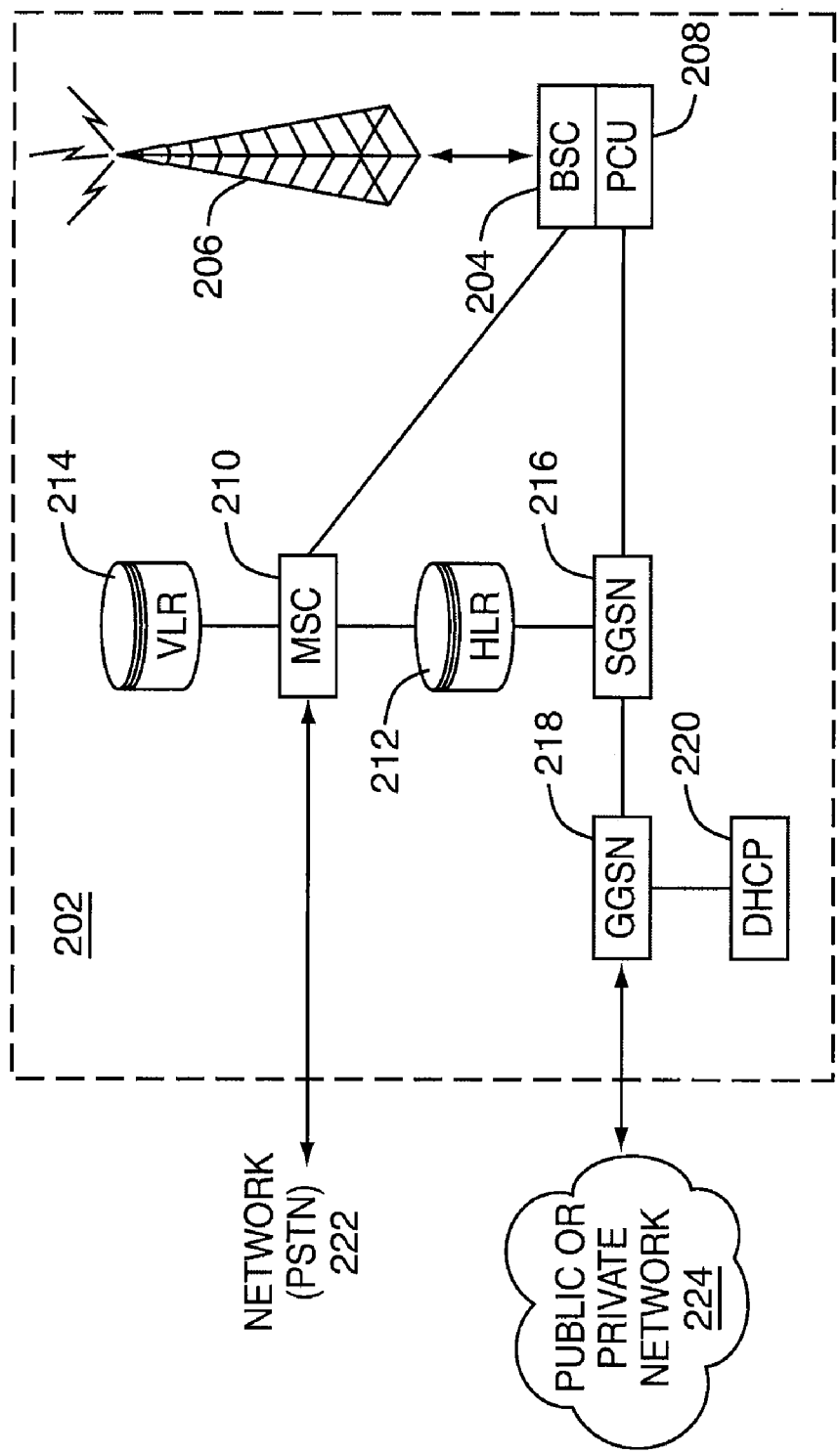
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE), Universal Mobile Telecommunications Service (UMTS), and Ultra Mobile Broadband (UMB), etc. New standards are still being defined, but it is believed that they will have similarities to the network behaviour described herein, and it will also be understood by persons skilled in the art that the embodiments of the present disclosure are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Other network communication technologies that may be employed include, for example, Integrated Digital Enhanced Network (iDEN™), Evolution-Data Optimized (EV-DO), and High Speed Downlink Packet Access (HSDPA), etc.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 may provide for a Subscriber Identity Module ("SIM") card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services may include without limitation: web browsing and messaging such as e-mail, voice mail, Short Message Service (SMS), and Multimedia Messaging Services (MMS). More advanced services may include without limitation: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 may be a battery-powered device and may include a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide the power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication include standards developed by the Infrared Data Association (IrDA), Bluetooth®, and the 802.11 family of standards (Wi-Fi®) developed by IEEE.

In use, a received signal such as a text message, an e-mail message, or web page download is processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad. A composed item may be transmitted over network 200 through communication subsystem 104.

For voice communications, the overall operation of mobile device 100 is substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 performs a "GPRS Attach" to acquire an IP address and to access data services. This normally is not present in circuit switched voice channels as Integrated Services Digital Network (ISDN) addresses are used for routing incoming and outgoing calls. Currently, GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
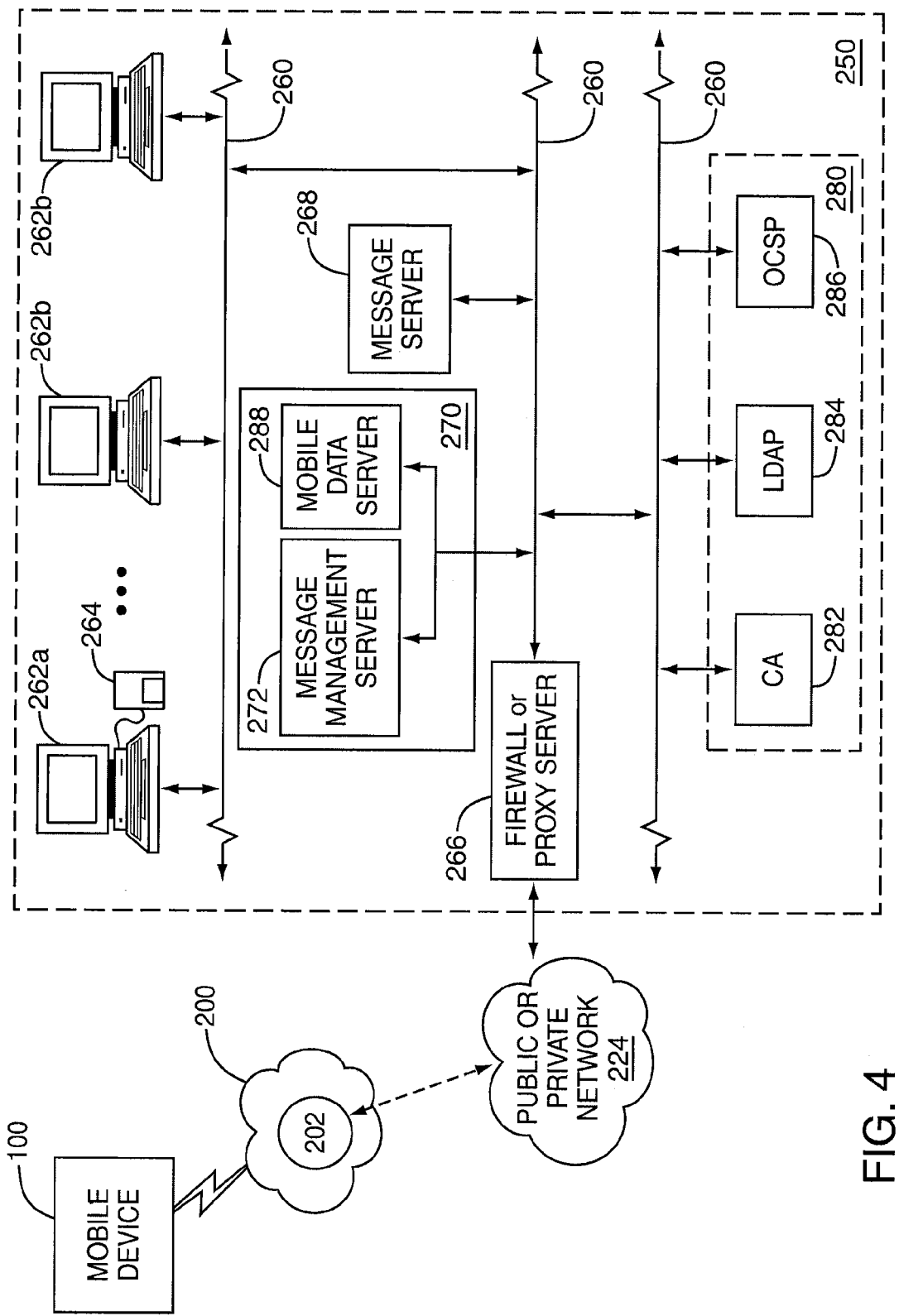
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection may include, for example, a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages may then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices is supported.

Embodiments described herein generally related to the processing of encoded messages, such as e-mail messages that are encrypted. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and protects data integrity and privacy from the time an originator of a message sends a message until it is decoded and read by the message recipient. Other known standards and protocols may be employed to facilitate secure message communication, such as Pretty Good Privacy™ (PGP), OpenPGP, and others known in the art.

Secure messaging protocols such as S/MIME rely on public and private encryption keys to provide confidentiality and integrity, and on a Public Key Infrastructure (PKI) to communicate information that provides authentication and authorization. Data encoded using a private key of a private key/public key pair can only be decoded using the corresponding public key of the pair, and data encoded using a public key of a private key/public key pair can only be decoded using the corresponding private key of the pair. It is intended that private key information never be made public, whereas public key information may be shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature generally comprises a digest of the message (e.g. a hash of the message) encoded using the sender's private key, which can then be appended to the outgoing message. To verify the digital signature of the message when received, the recipient uses the same technique as the sender (e.g. using the same standard hash algorithm) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the sender's private key should be able to encode a signature that the recipient will decode correctly using the sender's public key. Therefore, by verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

Figure 5:
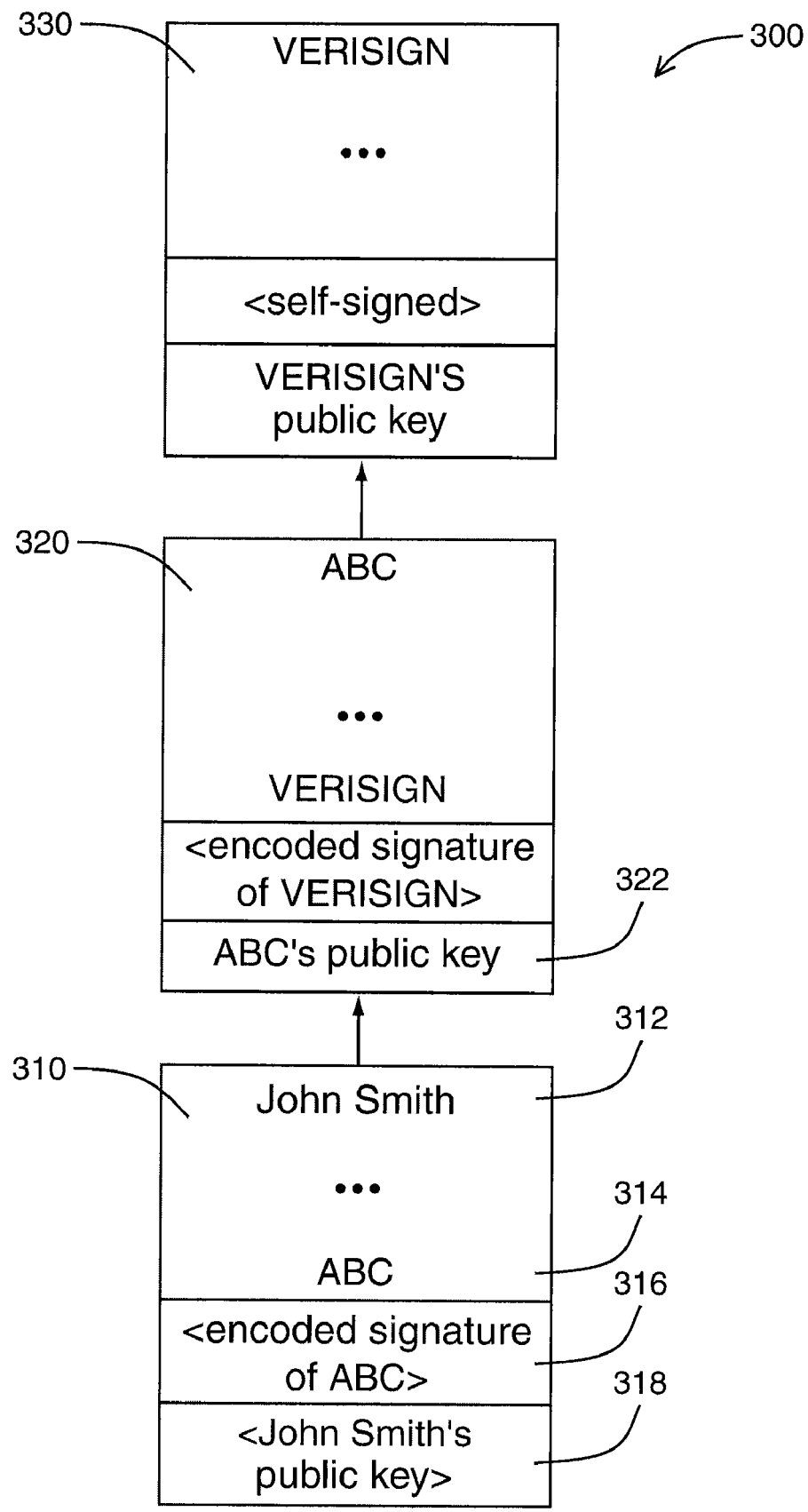
FIG. 5 is a block diagram showing an example of a certificate chain.

Consider FIG. 5, in which an example certificate chain 300 is shown. Certificate 310 issued to "John Smith" is an example of a certificate issued to an individual, which may be referred to as an end entity certificate. End entity certificate 310 typically identifies the certificate holder 312 (i.e. John Smith in this example) and the issuer of the certificate 314 (ABC in this example), and includes a digital signature of the issuer 316 and the certificate holder's public key 318. Certificate 310 may also include other information and attributes that identify the certificate holder (e.g. e-mail address, organization name, organizational unit name, location, etc.). When the individual composes a message to be sent to a recipient, it is customary to include that individual's certificate 310 with the message.

The certificate holder identified in a certificate is also referred to as the "subject" of that certificate. From the perspective of a given certificate holder, a certificate issued to him or her, and which typically contains his or her public key, may be referred to as a "personal certificate". Accordingly, in the example of FIG. 5, certificate 310 may be regarded as John Smith's personal certificate, as John Smith is the subject of certificate 310.

For a public key to be trusted, its issuing organization must be trusted. The relationship between a trusted CA (certificate authority or certification authority) and a user's public key can be represented by a series of related certificates, also referred to as a certificate chain. The certificate chain can be identified and followed to determine the validity of a certificate.

For instance, in the example certificate chain 300 shown in FIG. 5, the recipient of a message purported to be sent by John Smith may wish to verify the trust status of certificate 310 attached to the received message. To verify the trust status of certificate 310 on a recipient's computing device (e.g. computer 262a of FIG. 4) for example, the certificate 320 of issuer ABC is obtained, and used to verify that certificate 310 was indeed signed by issuer ABC. Certificate 320 may already be stored in a certificate store on the recipient's computing device, or it may need to be retrieved from a certificate source (e.g. Lightweight Directory Access Protocol (LDAP) server 284 of FIG. 4 or some other public or private LDAP server). If certificate 320 is already stored in the recipient's computing device and the certificate has been designated as trusted by the recipient, then certificate 310 is considered to be trusted since it chains to a stored, trusted certificate.

However, in the example shown in FIG. 5, certificate 330 is also required, when verifying the trust status of certificate 310. Certificate 330 is self-signed, and is referred to as a "root certificate". Accordingly, certificate 320 may be referred to as an "intermediate certificate" in certificate chain 300; any given certificate chain to a root certificate, assuming a chain to the root certificate can be determined for a particular end entity certificate, may contain zero, one, or multiple intermediate certificates. If certificate 330 is a root certificate issued by a trusted source (from a large certificate authority such as Verisign or Entrust, for example), then certificate 310 may be considered to be trusted since it chains to a trusted certificate. The implication is that both the sender and the recipient of the message trust the source of the root certificate 330. If a particular certificate cannot be chained to a trusted certificate, that certificate may be considered to be "not trusted".

Certificate servers store information about certificates and lists identifying certificates that have been revoked. These certificate servers can be accessed to obtain certificates and to verify certificate authenticity and revocation status. For example, an LDAP server may be used to obtain certificates, and an Online Certificate Status Protocol (OCSP) server may be used to verify certificate revocation status.

Standard e-mail security protocols typically facilitate secure message transmission between non-mobile computing devices (e.g. computers 262a, 262b of FIG. 4; remote desktop devices). Referring again to FIG. 4, in order that signed messages received from senders may be read from mobile device 100 and encrypted messages be sent to those senders, mobile device 100 is adapted to store certificates and associated public keys of other individuals. Certificates stored on a user's computer 262a may be downloaded from computer 262a to mobile device 100 through cradle 264, for example.

Certificates stored on computer 262a and downloaded to mobile device 100 are not limited to certificates associated with individuals but may also include certificates issued to CAs, for example. Certain certificates stored in computer 262a and/or mobile device 100 can also be explicitly designated as "trusted" by the user. Accordingly, when a certificate is received by a user on mobile device 100, it can be verified on mobile device 100 by matching the certificate with one stored on mobile device 100 and designated as trusted, or otherwise determined to be chained to a trusted certificate.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key may be exchanged between the computer 262a and mobile device 100 so that the user may share one identity and one method for accessing messages.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows® certificate store, another secure certificate store on or outside LAN 250, and smart cards, for example.

Figure 6:
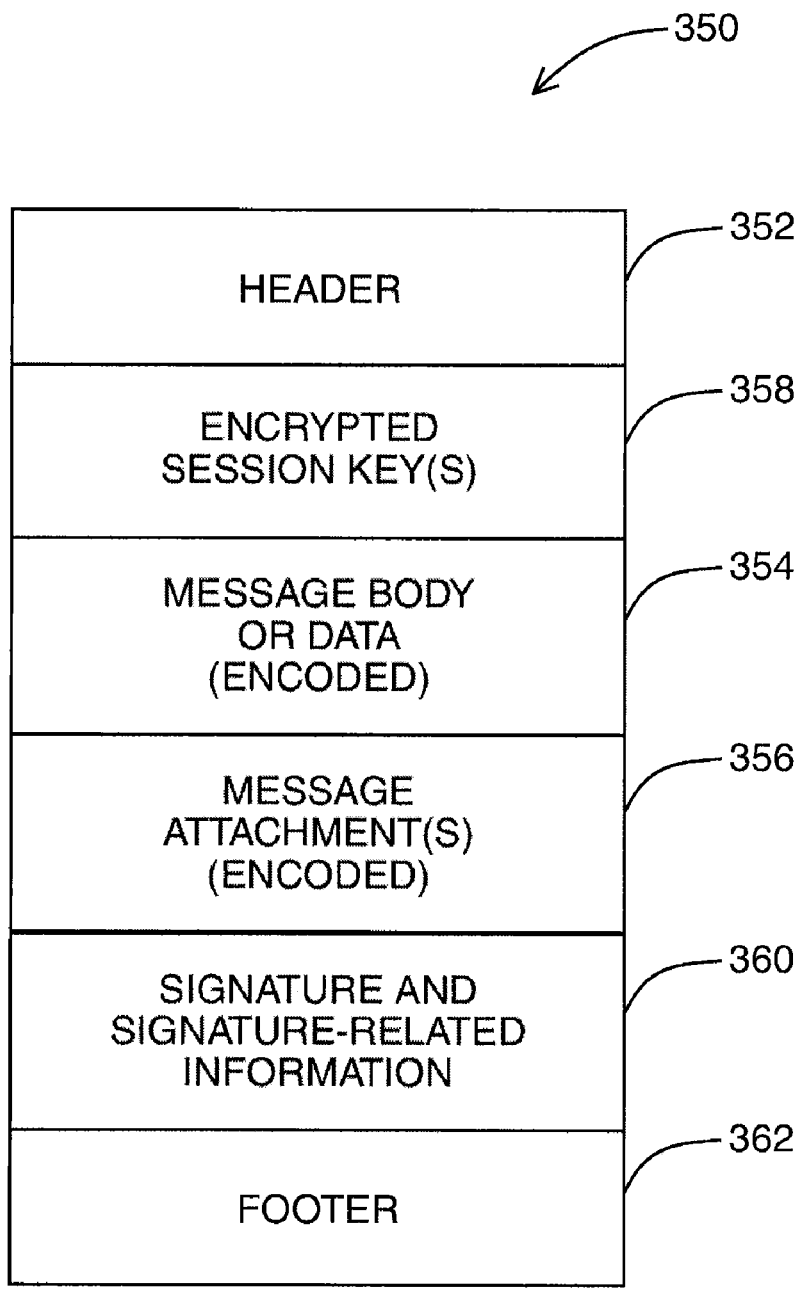
FIG. 6 is a block diagram illustrating components of an example of an encoded message.

Referring now to FIG. 6, a block diagram illustrating components of an example of an encoded message, as may be received by a message server (e.g. message server 268 of FIG. 4), is shown generally as 350. Encoded message 350 typically includes one or more of the following: a header portion 352, an encoded body portion 354, optionally one or more encoded attachments 356, one or more encrypted session keys 358, signature and signature-related information 360, and a footer 362. For example, header portion 352 typically includes addressing information such as "To", "From", and "CC" addresses, and may also include message length indicators, and sender encryption and signature scheme identifiers, for example. Actual message content normally includes a message body or data portion 354 and possibly one or more attachments 356, which may be encrypted by the sender using a session key. If a session key was used, it is typically encrypted for each intended recipient using the respective public key for each recipient, and included in the message at 358. If the message was signed, a signature and signature-related information 360 are also included. This may include the sender's certificate, for example.

The format for an encoded message as shown in FIG. 6 is provided by way of example only, and persons skilled in the art will understand that encoded messages may exist in other formats. For example, depending on the specific messaging scheme used, components of an encoded message may appear in a different order than shown in FIG. 6, and an encoded message may include fewer, additional, or different components, which may depend on whether the encoded message is encrypted, signed or both.

Embodiments described herein are generally directed to a system and method for controlling message attachment handling functions on a mobile device.

Consider the example described previously wherein a message management server analyzes a message intended for a user of a mobile device, and provides data to the mobile device that indicates the existence of one or more attachments to the message. The user can then consider this data (i.e. the message's "attachment structure") and subsequently request a specific attachment. While this configuration may be appropriate for unencrypted messages, it may be difficult to properly process the message in this manner if the message containing the attachment has been, for example, encrypted by the sender.

For instance, the message management server may receive an S/MIME message with the intention of analyzing it, so that it can transmit data identifying the attachment structure of the message to the mobile device. However, if the contents of the entire message have been encrypted with a public key associated with a user of the mobile device, the message management server typically cannot decrypt and analyze the contents of the message because it is not in possession of the user's private key, which is usually only available on the mobile device.

More specifically, the message management server cannot even determine whether or not the message contains an attachment, as the contents of the encrypted message will generally appear to the message management server as a single, encrypted block. The message management server may be required to forward the entire encrypted block to the mobile device for further processing without first determining the attachment structure of the message.

Accordingly, data associated with attachments may be inadvertently transmitted to the mobile device, when it normally would be desirable (e.g. due to bandwidth considerations) to only transmit such data for those attachments that are specifically requested by the user.

Moreover, as there may be a limit to the amount of data for a given message that can be transmitted to the mobile device, the mobile device may not even receive the entire encrypted block for processing in order that it might itself retrieve the attachments, which are typically provided near the end of the message.

One option that addresses at least some of these issues involves providing a remote server (e.g. a message management server) with a copy of the mobile device user's private key, so that the remote server may decrypt messages intended for the user, and identify the attachment structure for such messages to be provided to the user in known manner. However, as this would involve control of the private key to be relinquished by the user, the security risks associated with such an option would generally be considered undesirable. Moreover, in some circumstances, the private key simply cannot be sent to the server. For example, if the key is stored on a smart card, it may not be possible to copy it from the physical card.

As noted with reference to FIG. 6, an encrypted S/MIME message, or an encrypted PGP/MIME message for example, may comprise a session key that has been encrypted with the intended message recipient's public key. The body and attachments of the message are encrypted with the session key.

If such an encrypted message is addressed to a user of a mobile device, and is received by the mobile device from a remote server such as a message management server, the mobile device may decrypt the message with the user's private key to obtain the session key. This presumably can be done in most instances, even if the mobile device receives only a small part of the entire message for example, as the session key is typically provided near the beginning of a message. The session key can then be sent back to the message management server, which will generally have access to the original message in its entirety. Having now been provided with the session key, the message management server can then proceed to decrypt the message contents, determine the attachment structure for the message (e.g. the number of attachments and their types, identified by attachment name for the message), and send the attachment structure to the mobile device accordingly. After considering the attachment structure for the message, the user may request one or more specific attachments. The message management server or an attachment server, for example, can provide attachment data (e.g. unencrypted text and images) to the mobile device in response to the request.

By providing the message management server with only the decrypted session key for a given message and not the user's private key, greater security is afforded as the session key can only be used to decrypt the contents of that particular message.

However, the user may not want the session key for all messages received (i.e. in whole or in part) at the mobile device to be sent, in all instances, to the remote server. Depending on the particular message, and possibly the attachments that a user expects to accompany that message, the user may want to control whether the decrypted session key for that message should be provided to the remote server.

Embodiments described herein specifically relate to a system and method wherein a session key for a message is still transmitted by the mobile device to a remote server (e.g. a message management server) so that the remote server can process the message and determine the attachment structure for the message, but wherein the user is able to control how often and/or under what circumstances the decrypted session key will be provided to the remote server for this purpose.

For example, in accordance with various embodiments of the present disclosure, a user of the mobile device, or an administrator (e.g. through a security policy) can control the level of security associated with such attachment handling functions by setting an attachment handling control to identify an appropriate attachment handling control mode. The identified mode determines under what conditions the decrypted session key will be transmitted to the remote server.

In one broad aspect, there is provided a system and method for controlling message attachment handling functions on a mobile device, the method comprising: receiving at least a part of a message (e.g. an S/MIME message) at the mobile device from one or more remote servers (e.g. a message management server), the message comprising encrypted message data, the part of the message comprising an encrypted session key associated with the message; determining which one of a plurality of attachment handling control modes is identified by an attachment handling control, the plurality of attachment handling control modes comprising a first attachment handling control mode (e.g. an "Automatic" mode) that permits a decrypted session key to be transmitted from the mobile device to the one or more remote servers without user intervention after the part of the message is received at the mobile device; and decrypting the encrypted session key to determine the decrypted session key and transmitting the decrypted session key to the one or more remote servers if the attachment handling control identifies the first attachment handling control mode.

In another broad aspect, the plurality of attachment handling control modes further comprises a second attachment handling control mode (e.g. a "Manual" mode) that permits a decrypted session key to be transmitted from the mobile device to the one or more remote servers upon receiving user input at the mobile device to transmit the decrypted session key after the part of the message is received at the mobile device; and wherein the method further comprises decrypting the encrypted session key to determine the decrypted session key and transmitting the decrypted session key to the one or more remote servers upon receiving the user input at the mobile device to transmit the decrypted session key if the attachment handling control identifies the second attachment handling control mode.

In another broad aspect, wherein the plurality of attachment handling control modes further comprises a third attachment handling control mode (e.g. a "Disable" mode) that prevents a decrypted session key from being transmitted from the mobile device to the one or more remote servers; and wherein the method further comprises preventing transmission of a decrypted session key to the one or more remote servers if the attachment handling control identifies the third attachment handling control mode Accordingly, in one example embodiment, a user may be permitted to set the attachment handling control to identify a pre-identified attachment handling control mode. For example, an "Automatic" mode may be provided. If this mode is selected, the mobile device will automatically decrypt the session key(s) for any encrypted message it receives (in whole or in part) and send the decrypted session key(s) to the one or more remote servers, in order to fetch the attachment structure for the message. The mobile device automatically requests the attachment structure (without a need for user intervention) after an encrypted message is received, only if this mode is selected. Accordingly, operation in this mode requires the least amount of user interaction, but may also increase the security risk for the user.

As another example, a "Manual" mode may be provided. If this mode is selected, the mobile device will only send the decrypted session key(s) to the one or more remote servers in order to fetch the attachment structure for a message after the user manually requests the attachment structure. For example, the user may open a first part of an encrypted message and suspect that the message has an attachment (e.g. based on the message text that the mobile device has decrypted, or on a message classification identified in a message header). The user may then explicitly request the attachment structure for the message (e.g. by selecting a corresponding menu item provided by a messaging application). Operation in this mode involves some user interaction, but the user is given the opportunity to determine whether there might be a security risk involved with providing the remote server access to the message.

As another example, a "Disable" mode may be provided. If this mode is selected, the mobile device will not provide the decrypted session key to the one or more remote servers in order to fetch the attachment structure. Operation in this mode is the most secure from the user's perspective, since a remote server is not provided with the decrypted session key(s) for a message and accordingly cannot access the contents of the message. However, the user may not be able to view encrypted message attachments, particularly where the mobile device is not equipped with a native attachment viewer.

In a variant embodiment, the attachment handling control may be set (e.g. by an administrator) in accordance with a security policy that governs the use of the mobile device (e.g. IT Policy).

In another broad aspect, the mobile device is configured such that the attachment handling control is set to identify one of a configured (proper) subset of the plurality of attachment handling control modes.

In one example embodiment, the configured subset is configured in accordance with a security policy governing the use of the mobile device. For example, an administrator may wish to control the attachment handling control modes to be made available (e.g. for a user to set) on the mobile device. An IT Policy may be provided to limit the available attachment handling control modes to one of "Manual" or "Disable" only. In this manner, the administrator can ensure that decrypted session keys are never sent automatically to a remote server without the user's explicit authorization.

In another broad aspect, the method further comprises determining if an exception condition is satisfied by applying one or more filtering criteria to the message, wherein the device is configured such that the attachment handling control is set to identify an attachment handling control mode based on whether the exception condition is satisfied.

In one example embodiment, a further attachment handling control mode may define a "Filtered Automatic" mode of operation. For example, a user or administrator may define one or more filtering criteria (e.g. rules) so that the mobile device would operate in accordance with an "Automatic" mode of operation unless at least one of a pre-defined set of exception conditions is satisfied, in which case the mobile device would instead operate in accordance with a different mode (e.g. "Manual").

For example, an exception condition may comprise a rule that a pre-identified word is contained in one or more parts of the message. If the condition is satisfied, then the attachment structure will not be automatically fetched, and the user will be prompted to confirm transmission of the session key. As another example, an exception condition may comprise a rule that the message originated from a pre-identified sender. If the condition is satisfied, then the attachment structure will not be automatically fetched, and the user will be prompted to confirm transmission of the session key. As another example, an exception condition may comprise a rule that the message is associated with a pre-identified classification (e.g. as may be defined for an organization associated with the user). If the condition is satisfied, then the attachment structure will not be automatically fetched, and the user will be prompted to confirm transmission of the session key.

Conversely, in a variant embodiment, one or more rules can be defined such that the mobile device would operate in accordance with an "Automatic" mode of operation only if at least one of a pre-defined set of conditions is satisfied.

In a variant embodiment, filtering criteria may be associated with each of different attachment handling control modes, such that the mobile device will operate in accordance with a certain mode of operation depending on the filtering criteria that has been satisfied for a given mode.

In another broad aspect, the method further comprises: receiving an attachment request identifying an attachment to the message; transmitting the attachment request from the mobile device to the one or more remote servers (e.g. comprising an attachment server); the one or more remote servers configured to retrieve the identified attachment from message data that the one or more remote servers decrypts using the decrypted session key, and to transmit data associated with the attachment in decrypted form to the mobile device; and receiving data associated with the attachment in decrypted form at the mobile device.

These and other aspects and features of various embodiments will be described in greater detail below.

Figure 7:
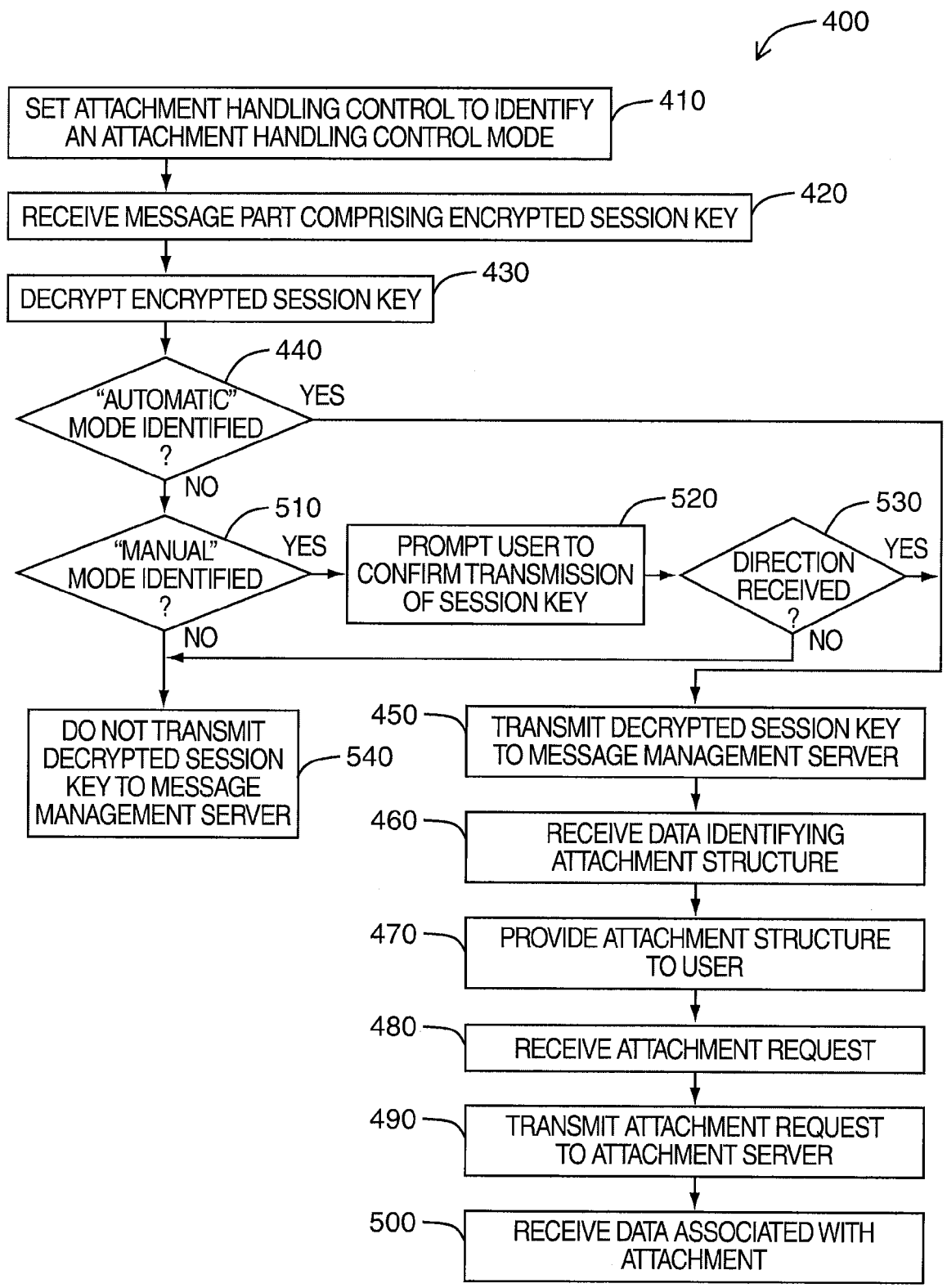
FIG. 7 is a flowchart illustrating a method of controlling message attachment handling functions on a mobile device in accordance with at least one embodiment.

Referring now to FIG. 7, a flowchart illustrating a method of controlling message attachment handling functions on a mobile device in accordance with at least one embodiment is shown generally as 400. Additional details of some of the features described below in respect of method 400 have been described earlier in the present description.

Method 400 is performed at the mobile device (e.g. mobile device 100 of FIG. 1). In one embodiment, at least some acts are performed by a messaging application that executes and resides on the mobile device. The messaging application need not be a stand-alone application, and the functionality of the messaging application may be implemented in one or more applications executing and residing on the mobile device.

At 410, an attachment handling control is set to identify one of a plurality of attachment handling control modes. The attachment handling control may be set by a user, or in accordance with a security policy (e.g. by an administrator in accordance with an IT Policy) that governs the use of the mobile device.

In one example embodiment, the plurality of attachment handling control modes may include an "Automatic" mode, a "Manual" mode, and a "Disable" mode, with properties as described previously in the present description. In some embodiments, the plurality of attachment handling control modes may include a "Filtered Automatic" mode as described herein.

The names of these modes are provided by way of example only, and it will be understood by persons skilled in the art that variants may be employed in any given implementation. Persons skilled in the art will also understand that these modes are provided by way of example only, and the modes provided in any given implementation may include all, some or none of the these, and may include one or more modes other than those described herein.

At 420, at least a part of an encrypted message is received at the mobile device. The part comprises a session key that has been encrypted (e.g. by the sender of the message) using the public key associated with a user of the mobile device, who is the intended recipient of the message.

By way of example, data received at 420 may be provided as one or more data blocks, as transmitted by a message management server (e.g. message management server 272 of FIG. 4 that has received the encrypted message from message server 268 of FIG. 4) to the mobile device.

At 430, the encrypted session key of the part received at 420 is decrypted at the mobile device. In a variant embodiment, this may not be performed until after a determination of the attachment handling control mode identified by an attachment handling control is made, as will be described in further detail below. Furthermore, in the variant embodiment, the act described at 430 may not be performed, depending on the specific attachment handling control mode identified by an attachment handling control.

At 440, it is determined if the attachment handling control mode identifies an "Automatic" mode. If so, the flow of the method proceeds automatically to 450.

At 450, the session key decrypted at 430 is transmitted in an attachment structure request to a remote server (e.g. message management server 272 of FIG. 4).

Where it is determined at 440 that the attachment handling control mode identifies an "Automatic" mode, the mobile device does not prompt the user to manually authorize that the decrypted session key is to be transmitted to the remote server before the decrypted session key is transmitted. The attachment structure request, which includes the decrypted session key (as well as data identifying the message and possibly other data), is transmitted automatically, that is without user intervention after the message part is received at 420 and the session key is decrypted at 430.

After the decrypted session key is transmitted to the remote server at 450, then at 460, data identifying the attachment structure for the message is received from the remote server. The attachment structure may then be output at the mobile device at 470.

In operation, if after receiving the attachment structure, the mobile device receives user input to request a specific attachment for the message, the acts described at 480 to 500 are performed. At 480, an attachment request that identifies one or more attachments is received as input at the mobile device. The attachment request is then transmitted from the mobile device to a remote server, such as an attachment server for example, at 490. This attachment request may also contain the session key for the message, in case the remote server needs to decrypt the message again in order to extract data associated with the requested attachment.

The functions of the attachment server may be provided by a message management server. Alternatively, the attachment server may be provided on a different device, and attachment requests may be routed via a message management server depending on the system configuration.

At 500, data associated with the attachment is received from the remote server at the mobile device in response to the user request, and can be rendered as output at the mobile device as desired. The data received at 500 is typically device-friendly, and may be provided as text and images that can be processed by a messaging application residing and executing on the mobile device.

Referring again to 440, if it is determined that the attachment handling control mode does not identify an "Automatic" mode, then the flow of the method proceeds to 510.

At 510, it is determined if the attachment handling control mode identifies a "Manual" mode. If so, the flow of the method proceeds to 520, at which the mobile device prompts the user to confirm whether the session key decrypted at 430 should be transmitted to the message management server. Alternatively, in a variant embodiment, the device may provide the user with a menu item to trigger the transmission of the session key, rather than explicitly prompting the user each time an encrypted message is received.

If a direction to transmit the decrypted session key to the message management server is received as input at the mobile device in response to the prompt, as determined at 530, or alternatively, if the user chooses to activate the provided menu item, then the flow of the method proceeds to 450, as previously described. However, if a direction to transmit the decrypted session key to the message management server is not received as input at the mobile device in response to the prompt (i.e. the user denies permission to transmit the decrypted session key for this particular message), or alternatively, if the user does not choose to activate the provided menu item, then the flow of the method will instead proceed to 540, as described below.

Referring again to 510, if it is determined that the attachment handling control mode does not identify an "Manual" mode, then the flow of the method proceeds to 540.

At 540, processing of the message (or part thereof received at 420 continues in a known manner. In this embodiment, the attachment handling control mode is deemed to identify to a "Disable" mode if this act at 540 is performed. Notably, the decrypted session key is not transmitted to the message management server. Accordingly, if an attachment to the message has not been transmitted to the mobile device, the mobile device will not be able to request attachment data from the message management server. Even if the attachment to the message has been transmitted to the mobile device, the mobile device might not be able to process the attachment at the mobile device, where the mobile device is not equipped with an attachment viewer.

Figure 8:
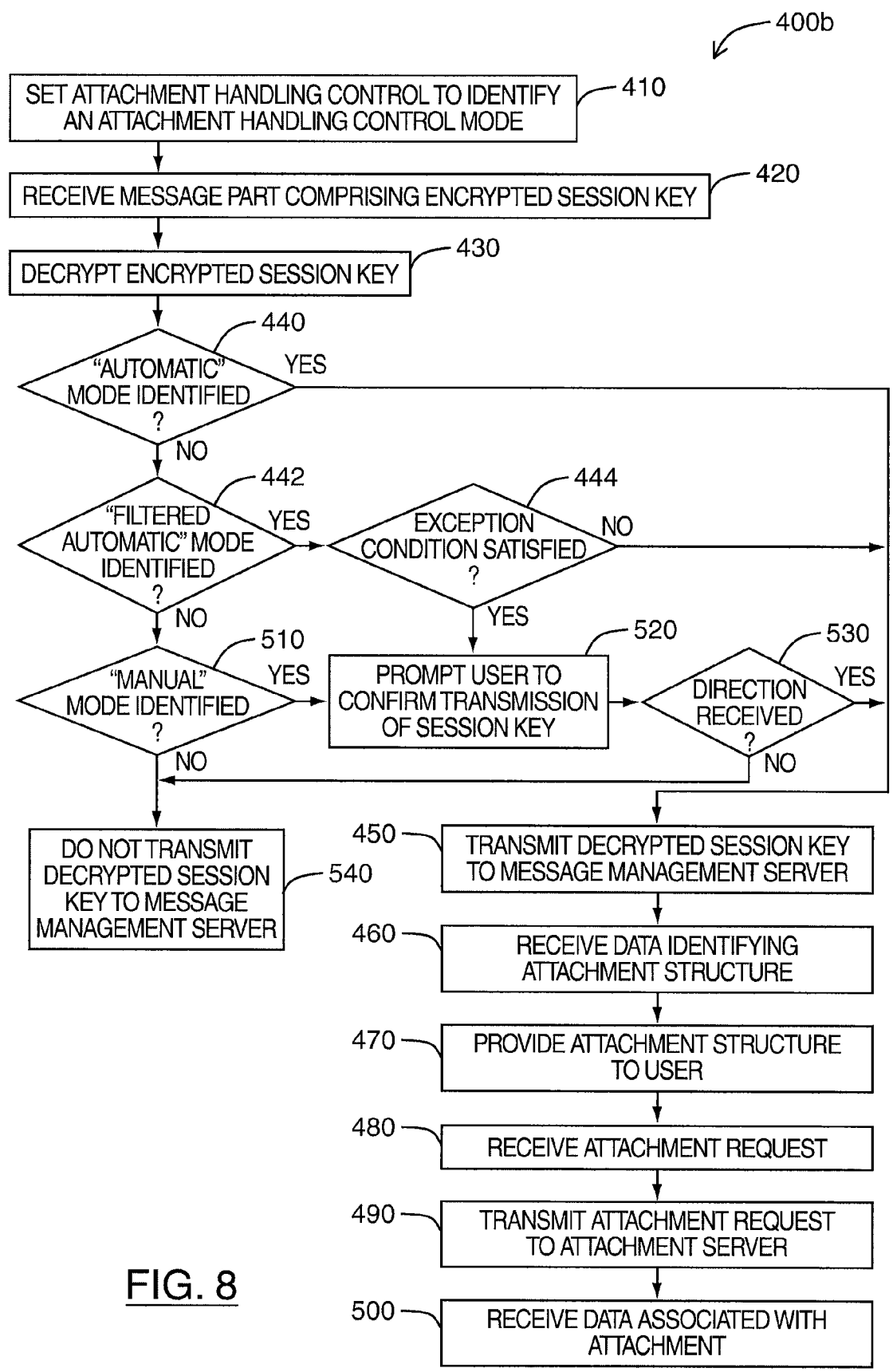
FIG. 8 is a flowchart illustrating a method of controlling message attachment handling functions on a mobile device in accordance with at least one other embodiment.

Referring now to FIG. 8, a flowchart illustrating a method of controlling message attachment handling functions on a mobile device in accordance with at least one other embodiment is shown generally as 400b. Details of some of the features in respect of method 400b are described earlier in the present description, and with reference to method 400 of FIG. 7.

Method 400b is similar to method 400, except that it relates to embodiments where an additional "Filtered Automatic" mode is provided. The name of this mode is provided by way of example only, and it will be understood by persons skilled in the art that variants may be employed in any given implementation.

As previously noted, a user or administrator may define filtering criteria (e.g. rules) so that the mobile device operates in accordance with an "Automatic" mode of operation unless at least one of a number of pre-defined exception conditions is satisfied. If an exception condition is satisfied, then the mobile device will operate in accordance with a different mode (e.g. "Manual").

In one example embodiment, if at 440, it is determined that the attachment handling control mode does not identify an "Automatic" mode, then the flow of method 400b proceeds instead to 442.

At 442, it is determined if the attachment handling control mode identifies a "Filtered Automatic" mode. If so, then the flow of the method proceeds to 444, where it is determined if at least one pre-defined exception condition is satisfied. This may entail determining, for example, if a pre-identified word is contained in one or more parts of the message. As another example, it may be determined whether the message originated from a pre-identified sender. As another example, it may be determined whether the message is associated with a pre-identified classification (e.g. as may be defined for an organization associated with the user). A combination of exception conditions may be applied.

If it is determined that an exception condition is satisfied, then the flow of the method proceeds to 520, where the mobile device prompts the user to confirm whether the session key decrypted at 430 can be transmitted to the message management server, as previously described with reference to method 400. If it is determined that no exception conditions are satisfied, then the flow of the method proceeds instead to 450, as previously described with reference to method 400. As noted with respect to method 400, the device may provide the user with a menu item to trigger the transmission of the session key, rather than explicitly prompting the user each time an encrypted message is received.

Referring again to 442, if it is determined that the attachment handling control mode does not identify a "Filtered Automatic" mode, then the flow of the method proceeds to 510, as previously described with reference to method 400.

Details of the other acts identified in FIG. 8 and not explicitly described above with respect to FIG. 8 are described earlier in the description with respect to method 400 of FIG. 7. Similar acts are identified by similar reference numerals.

In a variant embodiment, one or more rules can be defined such that the mobile device would operate in accordance with an "Automatic" mode of operation only if at least one of a pre-defined set of conditions is satisfied.

Persons skilled in the art will understand that certain acts of method 400 and method 400b may be repeated. For example, the acts described at 420 through 500 may be repeated when another message is to be received by the mobile device. As a further example, the act described at 410 may also be repeated when the attachment handling control is to be set to a different attachment handling control mode.

The method of controlling message attachment handling functions in accordance with any of the embodiments described herein may be provided as executable software instructions stored on computer-readable media, which may include transmission-type media.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The present disclosure makes reference to a number of embodiments. However, it will be understood by persons skilled in the art that other variants and modifications may be made without departing from the scope of the invention as defined in the claims appended hereto.

The invention claimed is:

1. A method for controlling message attachment handling functions on a mobile device, the method comprising:
providing an attachment handling control at the mobile device that is settable before a message is received from one or more remote servers, the attachment handling control for identifying one of at least a first key transmission mode, which permits a decrypted session key to be transmitted from the mobile device to the one or more remote servers without user intervention, and a second key transmission mode, which permits the decrypted session key to be transmitted from the mobile device to the one or more remote servers upon receiving user input at the mobile device to transmit the decrypted session key;

receiving at least a part of the message at the mobile device from the one or more remote servers, the message comprising encrypted message data, the part of the message comprising an encrypted session key associated with the message;

determining which one key transmission mode is identified by the attachment handling control;

in response to the attachment handling control identifying the first key transmission mode, decrypting the encrypted session key to determine the decrypted session key and transmitting the decrypted session key to the one or more remote servers without user intervention; and in response to the attachment handling control identifying the second key transmission mode, decrypting the encrypted session key to determine the decrypted session key and transmitting the decrypted session key to the one or more remote servers upon receiving the user input at the mobile device to transmit the decrypted session key.

2. The method of claim 1, further comprising receiving data identifying an attachment structure for the message from the one or more remote servers and providing the attachment structure as output.

3. The method of claim 2, further comprising:
receiving an attachment request, the attachment request identifying an attachment to the message;
transmitting the attachment request from the mobile device to the one or more remote servers; and
receiving the attachment in decrypted form at the mobile device.

4. The method of claim 1, wherein the attachment handling control is settable to identify a third key transmission mode that prevents the decrypted session key from being transmitted from the mobile device to the one or more remote servers; and wherein the method further comprises preventing transmission of a decrypted session key to the one or more remote servers if the attachment handling control identifies the third key transmission mode.

5. The method of claim 1, wherein the attachment handling control is set according to user input received at the mobile device.

6. The method of claim 1, wherein the attachment handling control is set in accordance with a security policy governing the use of the mobile device.

7. The method of claim 1, wherein the attachment handling control is set to identify one of a configured subset of a plurality of key transmission modes.

8. The method of claim 7, wherein the configured subset is configured in accordance with a security policy governing the use of the mobile device.

9. The method of claim 1, further comprising determining if an exception condition is satisfied by applying one or more filtering criteria to the message, wherein the attachment handling control is set to identify the first key transmission mode or the second key transmission mode based on whether the exception condition is satisfied.

10. The method of claim 9, wherein said determining if the exception condition is satisfied by applying the one or more filtering criteria to the message comprises at least one of: determining if a pre-identified word is contained in one or more parts of the message; determining if the message originated from a pre-identified sender; and determining if the message is associated with a pre-identified classification.

11. The method of claim 1, wherein the message is an S/MIME message.

12. The method of claim 1, wherein the message is a PGP/MIME message.

13. A non-transitory computer-readable medium comprising instructions executable on a processor of a computing device for performing the following:

providing an attachment handling control at the mobile device that is settable before a message is received from one or more remote servers, the attachment handling control for identifying one of at least a first key transmission mode, which permits a decrypted session key to be transmitted from the mobile device to the one or more remote servers without user intervention, and a second key transmission mode, which permits the decrypted session key to be transmitted from the mobile device to the one or more remote servers upon receiving user input at the mobile device to transmit the decrypted session key;

receiving at least a part of the message at the mobile device from the one or more remote servers, the message comprising encrypted message data, the part of the message comprising an encrypted session key associated with the message;

determining which one key transmission mode is identified by the attachment handling control;

in response to the attachment handling control identifying the first key transmission mode, decrypting the encrypted session key to determine the decrypted session key and transmitting the decrypted session key to the one or more remote servers without user intervention; and in response to the attachment handling control identifying the second key transmission mode, decrypting the encrypted session key to determine the decrypted session key and transmitting the decrypted session key to the one or more remote servers upon receiving the user input at the mobile device to transmit the decrypted session key.

14. A mobile device comprising at least a processor and a memory, wherein the mobile device is configured to execute an application module programmed to:

provide an attachment handling control at the mobile device that is settable before a message is received from one or more remote servers, the attachment handling control for identifying one of at least a first key transmission mode, which permits a decrypted session key to be transmitted from the mobile device to the one or more remote servers without user intervention, and a second key transmission mode, which permits the decrypted session key to be transmitted from the mobile device to the one or more remote servers upon receiving user input at the mobile device to transmit the decrypted session key;

receive at least a part of the message at the mobile device from the one or more remote servers, the message comprising encrypted message data, the part of the message comprising an encrypted session key associated with the message;

determine which one key transmission mode is identified by the attachment handling control;

in response to the attachment handling control identifying the first key transmission mode, decrypt the encrypted session key to determine the decrypted session key and transmit the decrypted session key to the one or more remote servers without user intervention; and in response to the attachment handling control identifying the second key transmission mode, decrypt the encrypted session key to determine the decrypted session key and transmit the decrypted session key to the one or more remote servers upon receiving the user input at the mobile device to transmit the decrypted session key.

15. A system for controlling message attachment handling functions on a mobile device, the system comprising a mobile device and one or more remote servers, wherein the mobile device comprises at least a processor and a memory, and wherein the mobile device is configured to execute an application module programmed to:

provide an attachment handling control at the mobile device that is settable before a message is received from one or more remote servers, the attachment handling control for identifying one of at least a first key transmission mode, which permits a decrypted session key to be transmitted from the mobile device to the one or more remote servers without user intervention, and a second key transmission mode, which permits the decrypted session key to be transmitted from the mobile device to the one or more remote servers upon receiving user input at the mobile device to transmit the decrypted session key;

receive at least a part of the message at the mobile device from the one or more remote servers, the message comprising encrypted message data, the part of the message comprising an encrypted session key associated with the message;

determine which one key transmission mode is identified by the attachment handling control;

in response to the attachment handling control identifying the first key transmission mode, decrypt the encrypted session key to determine the decrypted session key and transmit the decrypted session key to the one or more remote servers without user intervention; and in response to the attachment handling control identifying the second key transmission mode, decrypt the encrypted session key to determine the decrypted session key and transmit the decrypted session key to the one or more remote servers upon receiving the user input at the mobile device to transmit the decrypted session key.

16. The system of claim 15, wherein at least one of the one or more remote servers is configured to decrypt the encrypted message data using the decrypted session key received from the mobile device, determine an attachment structure for the message, and transmit data identifying the attachment structure for the message to the mobile device.

17. The system of claim 16, wherein the at least one of the one or more remote servers is configured to receive an attachment request identifying an attachment to the message from the mobile device, retrieve the attachment from the encrypted message data in decrypted form using the decrypted session key, and transmit the attachment in decrypted form to the mobile device.

18. The system of claim 15, wherein the at least one of the one or more remote servers comprises a message management server.

19. The system of claim 15, wherein the at least one of the one or more remote servers comprises an attachment server.

* * * * *